United States Patent
Cranna

(10) Patent No.: US 7,174,823 B2
(45) Date of Patent: Feb. 13, 2007

(54) SAW BLADE HAVING INCREASED TOOTH STIFFNESS AND RESISTANCE TO FATIGUE FAILURE

(75) Inventor: Mark T. Cranna, Somers, CT (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

(21) Appl. No.: 11/232,568

(22) Filed: Sep. 22, 2005

(65) Prior Publication Data

US 2006/0065098 A1 Mar. 30, 2006

Related U.S. Application Data

(60) Provisional application No. 60/612,604, filed on Sep. 22, 2004.

(51) Int. Cl.
*B27B 33/02* (2006.01)
*B27B 33/06* (2006.01)

(52) U.S. Cl. .............. 83/848; 83/835; 83/846

(58) Field of Classification Search ........... 83/661, 83/835, 846, 848
See application file for complete search history.

(56) References Cited

U.S. PATENT DOCUMENTS

| 29,688 A | 8/1860 | Germann |
| 3,034,378 A | 5/1962 | Anderson |
| 3,419,579 A | 12/1968 | Cowley |
| 4,232,578 A * | 11/1980 | Stellinger et al. ............. 83/661 |
| 4,292,871 A * | 10/1981 | Neumeyer et al. ............ 83/661 |
| RE31,433 E | 11/1983 | Clark |
| 4,557,172 A | 12/1985 | Yoneda |
| 4,688,458 A * | 8/1987 | Krilov ..................... 83/661 |
| 4,690,024 A | 9/1987 | Chaconas |
| 4,727,788 A | 3/1988 | Yoshida et al. |
| 4,784,033 A | 11/1988 | Hayden et al. |
| 4,958,546 A | 9/1990 | Yoshida et al. |
| 5,018,421 A * | 5/1991 | Lucki et al. ................... 83/835 |
| 5,249,485 A * | 10/1993 | Hayden, Sr. .................. 76/112 |
| 5,477,763 A | 12/1995 | Kullman |
| 5,603,252 A | 2/1997 | Hayden, Sr. |
| 5,606,900 A | 3/1997 | Stoddard |
| 5,832,803 A | 11/1998 | Hayden, Sr. |
| 6,119,571 A | 9/2000 | Hayden, Sr. |
| 6,167,792 B1 * | 1/2001 | Korb et al. ................... 83/835 |
| 6,220,140 B1 | 4/2001 | Hellebergh |
| 6,276,248 B1 | 8/2001 | Cranna |

(Continued)

*Primary Examiner*—Boyer D. Ashley
*Assistant Examiner*—Edward Landrum
(74) *Attorney, Agent, or Firm*—McCarter & English, LLP

(57) ABSTRACT

A band saw blade comprising a plurality of teeth, wherein each tooth comprises a tip; a rake face formed on one side of the tip; a primary clearance surface formed on an opposite side of the tip relative to the rake face; a secondary clearance surface formed on an opposite side of the primary clearance surface relative to the tip; and a gullet located on an opposite side of the rake face relative to the tip and defining a depth (D) between a base surface of the gullet and the tip. Each tooth further defines a first gullet radius (R1) located between the gullet and the secondary clearance surface; a second gullet radius (R2) extending between a base surface of the gullet and the rake face; and a pitch (P) between the respective tooth and a preceding tooth. In each tooth, R2>D>RQ, and D/P is between about 25% and 35%.

24 Claims, 3 Drawing Sheets

U.S. PATENT DOCUMENTS

| | | |
|---|---|---|
| 6,289,767 B1 | 9/2001 | Cookson |
| 6,439,094 B1 | 8/2002 | Yoneda et al. |
| 6,520,722 B2 | 2/2003 | Hopper et al. |
| 6,601,495 B2 * | 8/2003 | Cranna ................ 83/848 |
| 2002/0148340 A1 | 10/2002 | Tsujimoto |
| 2003/0089215 A1 | 5/2003 | Alton |
| 2003/0221534 A1 | 12/2003 | Lowder et al. |
| 2004/0016125 A1 | 1/2004 | Asada et al. |
| 2004/0035282 A1 | 2/2004 | Tsujimoto |
| 2004/0118263 A1 | 6/2004 | Hellbergh |
| 2004/0182218 A1 * | 9/2004 | Chao ................ 63/848 |

* cited by examiner

SAW BLADE HAVING INCREASED TOOTH STIFFNESS AND RESISTANCE TO FATIGUE FAILURE

CROSS-REFERENCE TO RELATED APPLICATION

This application claims priority on U.S. Provisional Application Ser. No. 60/612,604, filed Sep. 22, 2004, titled "Wood Cutting Saw Blade", which is hereby incorporated by reference in its entirety.

FIELD OF THE INVENTION

The present invention relates to saw blades, and more particularly, to wood cutting saw blades, such as band saw blades.

BACKGROUND INFORMATION

Wood-cutting saw blades, and particular wood-cutting band saw blades, serve a critical function in performing semi-finish re-sawing of wood work pieces, such as wood cants, into boards in the fencing, pallet and other industries. A typical prior art wood-cutting band saw blade is illustrated in FIG. 1. Each tooth of the saw blade of FIG. 1 defines a gullet depth D, a pitch distance P between successive teeth, a first gullet radius R1 formed at the lower base of the clearance surface(s), a second gullet radius R2 formed at the base of the rake face, and a gullet transition radius R3 formed between the second gullet radius R2 and the base of the rake face (or primary rake angle). Typically, R2 defines a minimum radius ($R_{min}$) formed at the base of the gullet. The illustrated wood cutting band saw blade defines a constant pitch P, a single level set (i.e., the set teeth are all set to the same set magnitude), an aggressive rake face angle (e.g., about 10° or greater), a primary clearance surface defining a primary clearance angle of about 30° (but no secondary clearance surface), and the following additional characteristics:

D/P<35%;
R1>D;
R1>R2;
R2 (or $R_{min}$)/D<15%; and
R1>D>R2.

One of the drawbacks associated with such prior art wood-cutting band saw blades is that blade life is limited due to fatigue related failures caused in part by the primary stress riser (R2) being located at the base of the rake face. The R2 region is a critical stress zone due to band tension in combination with cutting forces impinging on the tooth edge. As a result, this type of tooth configuration, particularly when subjected to relatively high-cycle wood-cutting applications, can be subject to premature band breakage and/or other fatigue-related problems. In addition, such traditional tooth geometries amplify forces at the cutting edge by having a relatively thin upper tooth cross-section/set bend plane that promotes "set collapse" and the subsequent reduction in overall kerf or blade clearance. Also, by traditionally maintaining a uniform pitch distance P, the resulting forcing frequency creates excessive vibration and noise that prevents consistent loading of the teeth. This random pattern of tooth loading results in a rough sawn surface that has difficulty maintaining a consistent cutting plane through regions of varying wood density, such as knots.

Accordingly, it is an object of the present invention to overcome one or more of the above-described drawbacks and/or disadvantages of the prior art.

SUMMARY OF THE INVENTION

The present invention is directed to a saw blade, such as a wood-cutting band saw blade, comprising a cutting edge defined by a plurality of teeth spaced relative to each other, wherein each tooth includes a tip; a rake face formed on one side of the tip; a primary clearance surface formed on an opposite side of the tip relative to the rake face; at least one secondary clearance surface formed on an opposite side of the primary clearance surface relative to the tip; and a gullet located on an opposite side of the rake face relative to the tip and defining a depth (D) between a base surface of the gullet and the tip. Each tooth further defines a first gullet radius (R1) located between the gullet and the at least one secondary clearance surface; a second gullet radius (R2) extending between a base surface of the gullet and the rake face; and a pitch (P) between the respective tooth and a preceding tooth in a cutting direction of the saw blade. In accordance with the present invention, R2>D>R1, and D/P is within the range of about 25% to about 35%. In the currently preferred embodiments of the present invention, D/P is within the range of about 29% to about 33%. In one such embodiment, D/P is about 30.5%.

Also in the currently preferred embodiments of the present invention, R2/R1 ≧ about 1.4, and in one such embodiment, R2/R1 is about 1.8. The gullet of each tooth also defines a minimum radius ($R_{min}$) at a base of the gullet. In the currently preferred embodiments of the present invention, $R_{min}$ is R1. However, as may be recognized by those of ordinary skill in the pertinent art based on the teachings herein, $R_{min}$ may be other than R1, and may be located, for example, between R1 and R2. In the currently preferred embodiments of the present defines a primary acute relief angle, and the secondary clearance surface defines a secondary acute relief angle that is less than the primary acute relief angle. In the currently preferred embodiments of the present invention, the primary acute relief angle is within the range of about 22° to about 35°, and the secondary acute relief angle is within the range of about 5° to about 20°. In one such embodiment, the primary acute relief angle is about 28°, and the secondary acute relief angle is about 15°. Also in the currently preferred embodiments, the tertiary clearance surface is defined by a radius (R4) within the range of about 0.06 inch to about 0.1 inch. In one such embodiment, R4 is about 0.08 inch.

Also in the currently preferred embodiments of the present invention, the plurality of teeth define a pitch pattern of at least eight teeth, and set patterns within each pitch pattern. Each set pattern is defined by an unset leading tooth and a plurality of offset trailing teeth. Each offset trailing tooth is offset in a respective set direction relative to the unset leading tooth, and each offset trailing tooth defines approximately the same set magnitude as every other like set tooth within the respective set pattern. Each tooth within each set pattern defines an accumulated pitch between the respective tooth and a preceding tooth of like set direction in the cutting direction of the saw blade. The ratio of pitch to accumulated pitch for each tooth of like set direction within each set pattern increases from one tooth to the next in the direction opposite the cutting direction of the saw blade for distributing the cutting load over the teeth of the saw blade. Preferably, the plurality of teeth define an even number pitch pattern of at least eight teeth, and odd number set patterns within each pitch pattern. The illustrated embodiments of the present invention define (i) a ten tooth pitch pattern and three/seven set pattern, and (ii) an eight tooth pitch pattern and three/five set pattern.

One advantage of the saw blades of the present invention is that the gullet radius R2 at the base of the rake face is greater than the depth D of the gullet. As a result, the saw blades of the present invention define an increased cross-sectional width at the set-bend plane of the tooth, and thus provide significantly increased tooth stiffness and, in turn, prevent the set collapse and subsequent excessive heat generation encountered in prior art wood-cutting band saw blades.

Another advantage of the saw blades of the present invention is that both the gullet radius R2 at the base of the rake face and the depth D of gullet are greater than the gullet radius R1 at the lower base of the clearance surfaces. Further, the ratio of R2/R1 is greater than or equal to about 1.4. As a result, the band saw blades of the present invention relocate the point of critical crack initiation to a region of reduced stress as compared to prior art wood-cutting band saw blades, thus further increasing the resistance of the teeth to fatigue failure.

Accordingly, the saw blades of the present invention, and particularly the wood-cutting band saw blades of the present invention, have a tooth form and pitch pattern that prevent band breakage due to fatigue related issues, including increased cutting forces and heat due to set collapse and the subsequent reduction in overall kerf.

Other objects and advantages of the present invention will become more readily apparent in view of the following detailed description of the currently preferred embodiments and related drawings.

DETAILED DESCRIPTION OF THE PREFERRED EMBODIMENTS

Figure 1:
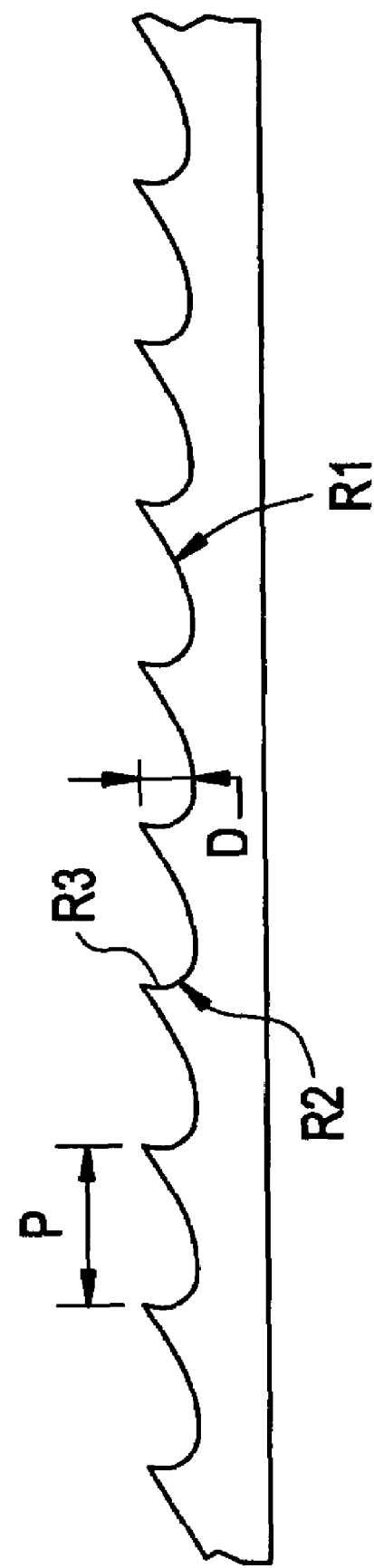
FIG. 1 is a partial, side-elevational view of a prior art wood-cutting band saw blade.
Figure 2:
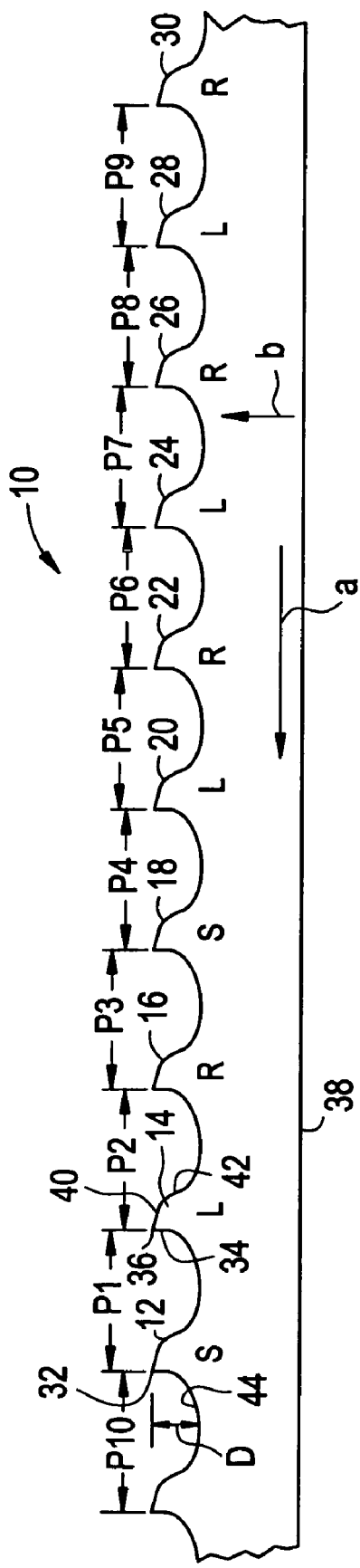
FIG. 2 is a partial, side elevational view of a first embodiment of a band saw blade of the present invention defining a ten tooth pitch pattern, and a three/seven set pattern within the pitch pattern.
Figure 4:
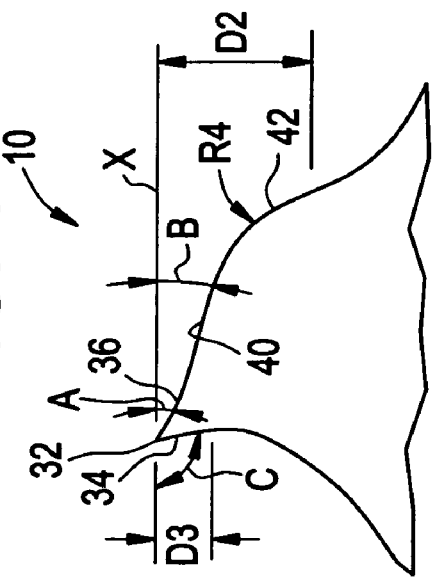
FIG. 4 is an enlarged side elevational view of one of the teeth of FIG. 2.
Figure 3:
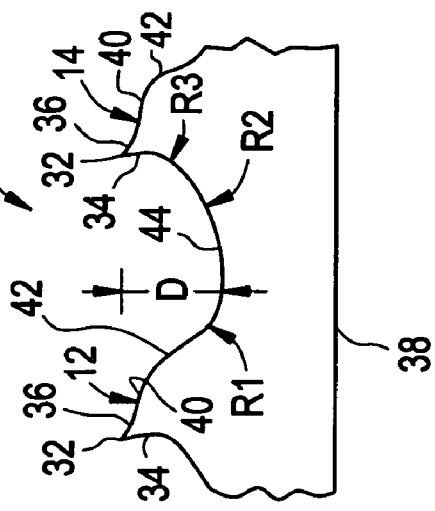
FIG. 3 is an enlarged partial, side elevational view of two teeth of the saw blade of FIG. 2.

FIGS. 2 through 4, a wood-cutting band saw blade embodying the present invention is indicated generally by the reference numeral 10. The band saw blade 10 defines a cutting direction indicated by the arrow "a", and a feed direction indicated by the arrow "b". The band saw blade 10 comprises a plurality of recurrent or repetitive patterns of teeth defining a 10-tooth pitch pattern. Each pitch pattern is defined by a recurrent group of 10 successive teeth indicated by the reference numerals 12, 14, 16, 18, 20, 22, 24, 26, 28 and 30. As shown in FIG. 2, each tooth defines a respective pitch or tooth spacing P1 through P10. In the preferred embodiments of the present invention, and as indicated in FIG. 2, the pitch or tooth spacing is measured between the tips of adjacent teeth. However, as may be recognized by those of ordinary skill in the pertinent art based on the teachings herein, the pitch or tooth spacing may be measured between any of numerous other corresponding points between adjacent teeth.

As shown typically in FIGS. 3 and 4, each tooth of the band saw blade 10 includes a tip 32, a rake face 34 formed on one side of the tip, and a primary clearance surface 36 formed on the opposite side of the tip relative to the rake face and defining a primary acute relief angle "A" (FIG. 4) relative to a back edge 38 of the blade (or a plane extending between the tips of unset teeth, or otherwise of teeth of like set direction and magnitude). A secondary clearance surface 40 is formed on the opposite side of the primary clearance surface 36 relative to the tip 32, and as shown in FIG. 4, the secondary clearance surface defines a secondary acute relief angle "B" relative to the back edge 38 (or other reference plane) of the blade that is less than the primary acute relief angle A. A tertiary clearance surface 42 is formed on the opposite side of the secondary clearance surface 40 relative to the primary clearance surface 36. As shown in FIG. 4, the tertiary clearance surface 42 is a curvilinear surface defined by a radius R4. Preferably, the primary acute relief angle A is within the range of about 22° to about 35°, and the secondary acute relief angle B is within the range of about 5° to about 20°. In the illustrated embodiment, the primary acute relief angle A is about 28°, and the secondary acute relief angle B is about 15°. Preferably, the radius R4 of the tertiary clearance surface is within the range of about 0.06 inch to about 0.1 inch, and in the illustrated embodiment, is about 0.08 inch. As shown in FIG. 4, R4 terminates at a depth D2 below the tip 32. Preferably, D2 is within the range of about 0.06 inch to about 0.1 inch, and in the illustrated embodiment, is about 0.08 inch. The rake face 34 extends to a depth D3 below the tip 32. Preferably, D3 is within the range of about 0.01 inch to about 0.06 inch, and in the illustrated embodiment, is about 0.03 inch. As also shown in FIG. 4, the rake face 34 defines an acute rake face angle C. Preferably, the acute rake face angle C is within the range of about 5° to about 20°, and in the illustrated embodiment, is within the range of about 10° to about 12°. As may be recognized by those of ordinary skill in the pertinent art based on the teachings herein, these particular angles and dimensions are exemplary, and may be changed as desired or otherwise required by a particular application.

Each tooth further includes a gullet 44 located on an opposite side of the rake face 34 relative to the tip 32 and defining a depth D between a base surface of the gullet and the tip 32. As shown best in FIG. 3, each gullet 44 defines a first gullet radius R1 extending between the base surface of the gullet and the tertiary clearance surface 42, and a second gullet radius R2 extending between the base surface of the gullet and a gullet radius transition R3. The gullet radius transition R3 extends between the second gullet radius R2 and the rake face 34.

In accordance with the present invention, R2>D>R1, and D/P is within the range of about 25% to about 35%. Preferably, R2/R1≧about 1.4, and in the illustrated embodiment, is about 1.8. Preferably, D/P is within the range of about 29% to about 33%, and in the illustrated embodiment, is about 30.5%. In the illustrated embodiments of the present invention, R1 is the minimum radius ($R_{min}$) at the base of the gullet. However, as may be recognized by those of ordinary skill in the pertinent art based on the teachings herein, $R_{min}$ may be other than R1, and may be located, for example, between R1 and R2. Preferably, $R_{min}/D$> about 20%, and in the illustrated embodiment, is about 25%. One advantage of this feature is that it prevents the formation of a stress riser at $R_{min}$ that could lead to a premature fatigue-related failure of the blade. Preferably, the gullet radius transition R3 is within the range of about 0.03 inch to about 0.12 inch, and in the illustrated embodiment, is within the range of about 0.04 inch to about 0.08 inch. In the illustrated embodiment, the pitch (P), R1, R2, R3, D and D2 are set forth in the Table 1 below (all dimensions are in inches). As may be recognized by those of ordinary skill in the pertinent art based on the teachings herein, these dimensions are only exemplary of the illustrated embodiment, and may be changed as desired or otherwise required by a particular application.

TABLE 1

| Tooth # | Pitch | R1 | R2 | R3 | D | D2 | D3 |
|---|---|---|---|---|---|---|---|
| 12 | P1 = 0.509 | 0.136 | 0.3 | 0.07 | 0.174 | 0.08 | 0.03 |
| 14 | P2 = 0.475 | 0.126 | 0.3 | 0.07 | 0.162 | 0.08 | 0.03 |
| 16 | P3 = 0.44 | 0.11 | 0.3 | 0.07 | 0.155 | 0.08 | 0.03 |
| 18 | P4 = 0.423 | 0.1 | 0.2 | 0.07 | 0.15 | 0.08 | 0.03 |
| 20 | P5 = 0.387 | 0.095 | 0.18 | 0.04 | 0.15 | 0.076 | 0.03 |
| 22 | P6 = 0.37 | 0.095 | 0.16 | 0.04 | 0.15 | 0.076 | 0.03 |
| 24 | P7 = 0.405 | 0.1 | 0.2 | 0.055 | 0.15 | 0.08 | 0.03 |
| 26 | P8 = 0.457 | 0.115 | 0.3 | 0.07 | 0.158 | 0.08 | 0.03 |
| 28 | P9 = 0.492 | 0.13 | 0.3 | 0.07 | 0.168 | 0.08 | 0.03 |
| 30 | P10 = 0.526 | 0.14 | 0.3 | 0.07 | 0.18 | 0.08 | 0.03 |

One advantage of the band saw blades of the present invention is that because R2>D>R1, wherein R2/R1≧about 1.4 and $R_{min}/D$>about 20%, the critical crack initiation point is moved to the relatively reduced stress region of R1. This, in turn, minimizes the likelihood of fatigue failure occurring in the region R2 which is subject to relatively high tensile stresses due to the cutting forces at the tooth edge. Another advantage of the band saw blades of the present invention is that they define a relatively large, and thus safe ratio of R1/D, to thereby avoid introducing any excessive stresses or stress risers in the region R1 (which is the critical crack initiation region).

Yet another advantage of the band saw blades of the present invention is that because R2>D, and further, because of the disclosed configuration of the secondary and tertiary clearance surfaces 40 and 42, respectively (i.e., the secondary clearance surface 40 is oriented at an acute angle B that is less than the primary clearance angle A, and is within the range of about 5° to about 20°, and the tertiary clearance surface 42 is defined by a radius R4 that terminates at D2), there is a significantly increased cross-sectional width at the set-bend plane (which in the illustrated embodiments is at a depth of about 0.1 inch from the tip 34) in comparison to prior art wood-cutting band saw blades. In the illustrated embodiment, the cross-sectional width at the set-bend plane is at least about 10% to about 20% greater than in known prior art wood-cutting band saw blades. This increased cross-sectional width provides greater tooth stiffness in comparison to prior art wood-cutting band saw blades that, in turn, prevents premature "set collapse" and the subsequent excessive heat generation and increased cutting forces associated with such set collapse. Further, the increased tooth stiffness of the wood-cutting band saw blades of the present invention facilitates the ability to obtain straighter cuts, particular through difficult to cut portions of work pieces, such as wood knots, in comparison to prior art wood-cutting band saw blades. The greater tooth stiffness of the band saw blades of the present invention is particularly advantageous for high-carbon blades that exhibit relatively low surface hardness (e.g., within the range of about 41–45 HRc). Accordingly, the band saw blades of the present invention are particularly well suited for high-cycle wood-cutting applications, and particularly such applications that involve cutting relatively narrow width material (e.g., on the order of about one inch).

The teeth of the saw blade 10 define multiple single-level set patterns within extended pitch patterns as disclosed in U.S. Pat. No. 6,276,248 to Cranna, which is assigned to the Assignee of the present invention, and is hereby expressly incorporated by reference as part of the present disclosure. More specifically, the teeth of the saw blade 10 define a pitch pattern of at least eight teeth, and set patterns within each pitch pattern. Preferably, the teeth define an even number pitch pattern, and odd number set patterns within each pitch pattern. In the illustrated embodiment, the illustrated teeth 12 through 30 define a ten tooth pitch pattern and a three/seven set pattern within each pitch pattern. As can be seen, a first set pattern is defined by the three successive teeth 12, 14 and 16, and a second set pattern is defined by the next seven successive teeth 18, 20, 22, 24, 26, 28 and 30. As shown in FIG. 2, the first set pattern is defined by a first unset leading tooth 12, a primary left set trailing tooth 14, and a primary right set trailing tooth 16. The second set pattern is defined by a first unset leading tooth 18, a primary left set trailing tooth 20, a primary right set trailing tooth 22, a secondary left set trailing tooth 24, and a secondary right set trailing tooth 26, a tertiary left set trailing tooth 28, and a tertiary right set trailing tooth 30. Each unset leading tooth 12 and 18 is symmetrical about the plane of symmetry of the band saw blade 10, and defines a cutting edge substantially located within a cutting plane "x" (FIG. 4) which is approximately perpendicular to the plane of symmetry. Each left set trailing tooth 14, 20, 24 and 28 is tilted or set to the left relative to the plane of symmetry (when viewed from the cutting direction "a" of the saw blade), and defines a cutting edge substantially located within a respective cutting plane tilted or set at an acute angle relative to the plane of symmetry. Similarly, each right set trailing tooth 16, 22, 26 and 30 is tilted or set to the right relative to the plane of symmetry, and defines a cutting edge substantially located within a respective cutting plane tilted or set an acute angle relative to the plane of symmetry. Each set tooth defines substantially the same magnitude of set as the other teeth of like set direction, thus defining a "single level" set blade. Each set tooth also defines the same tooth height as the other teeth of like set direction. As may be recognized by those of ordinary skill in the pertinent art based on the teachings herein, the illustrated pitch and set pattern is only exemplary, and the saw blade 10 may instead employ an eight tooth pitch pattern and three/five set pattern, or may employ any other desired extended pitch pattern and set pattern combination that is currently known, or that later becomes known.

Each tooth within each set pattern defines an accumulated pitch between the respective tooth and a preceding tooth of like set direction in the cutting direction "a" of the saw blade; and the ratio of pitch to accumulated pitch for each tooth of like set direction within each set pattern increases from one tooth to the next in the direction opposite the cutting direction of the saw blade for distributing the cutting load over the teeth of the saw blade. Preferably, each tooth defines a different pitch than every other tooth within its respective set pattern, and most preferably, each tooth defines a different pitch than every other tooth within its respective pitch pattern. Also in accordance with the currently preferred embodiments of the present invention, each of the offset teeth defines approximately the same tooth height as every other like set tooth within the respective set pattern, and each of the offset teeth defines approximately the same set magnitude as every other like set tooth within the respective pitch pattern.

One advantage of employing the multiple set patterns within extended pitch patterns as described herein is that it facilitates the ability of the saw blades of the present invention to achieve maximum surface finish and vibration reduction benefits without sacrificing tooth loading constraints or inefficiencies that otherwise might be associated with the extended single-level set patterns encountered in prior art wood-cutting band saw blades. Another advantage of the band saw blades of the present invention is that the variable pitch (each tooth defines a different pitch than every other tooth within the respective set pattern, or pitch pattern) reduces noise and vibrations during cutting which, in turn, leads to improved surface finishes on the work pieces being cut, and a more even distribution of tooth loading in comparison to prior art wood-cutting band saw blades. The more even, or substantially equal tooth loading, provides improved blade life, and further, enables gullet size optimization.

Figure 5:
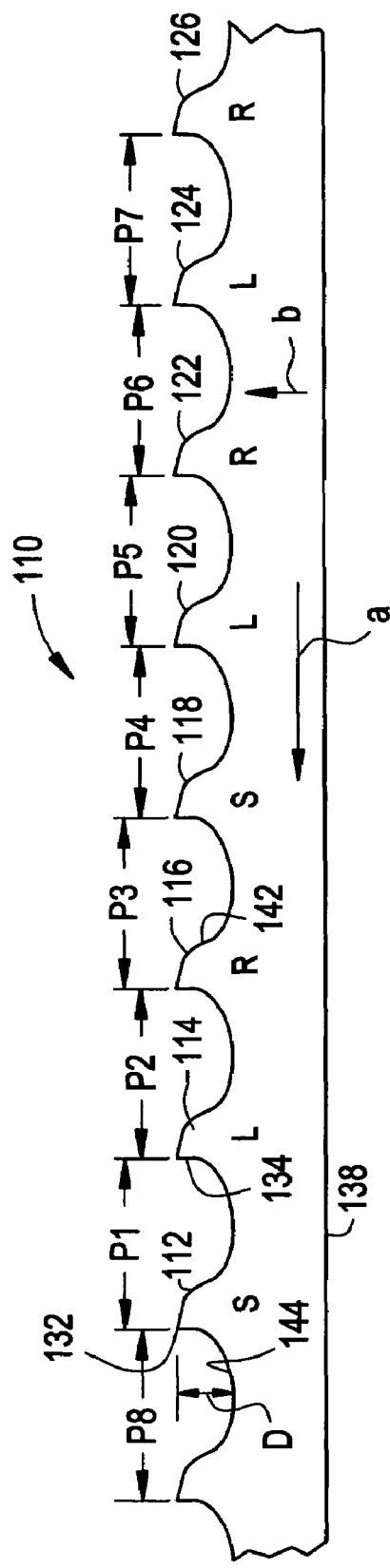
FIG. 5 is a partial, side elevational view of a second embodiment of a band saw blade of the present invention defining an eight tooth pitch pattern, and a three/five set pattern within the pitch pattern.
Figure 7:
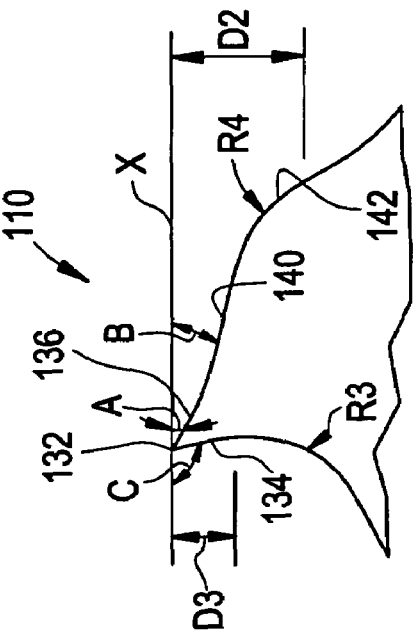
FIG. 7 is an enlarged side elevational view of one of the teeth of FIG. 5.
Figure 6:
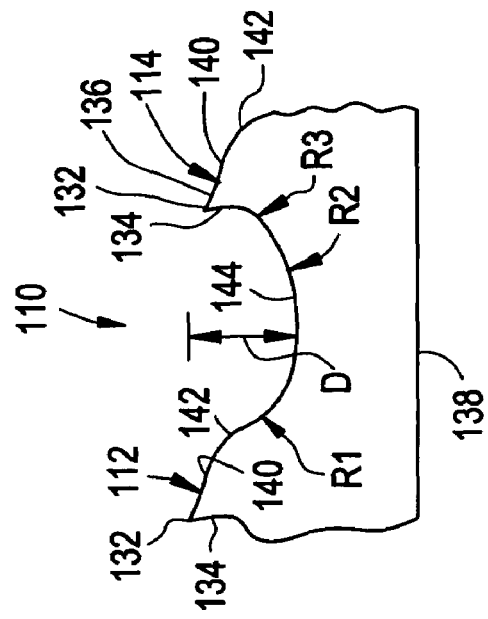
FIG. 6 is an enlarged partial, side elevational view of two teeth of the saw blade of FIG. 5.

Turning to FIGS. 5 through 7, another band saw blade embodying the present invention is indicated generally by the reference numeral 110. The band saw blade 110 is substantially similar to the band saw blade 10 described above with reference to FIGS. 2 through 4, and therefore like reference numerals preceded by the numeral "1" are used to indicate like elements. The primary difference of the band saw blade 110 in comparison to the band saw blade 10 is that the band saw blade 110 defines an eight tooth pitch pattern, and a three/five set pattern. In the illustrated embodiment, the pitch (P), R1, R2, R3, D, D2 and D3 are set forth in the Table 2 below (all dimensions are in inches). As may be recognized by those of ordinary skill in the pertinent art based on the teachings herein, these dimensions are only exemplary of the illustrated embodiment, and may be changed as desired or otherwise required by a particular application.

TABLE 2

| Tooth # | Pitch | R1 | R2 | R3 | D | D2 | D3 |
|---|---|---|---|---|---|---|---|
| 112 | P1 = 0.0.706 | 0.19 | 0.333 | 0.07 | 0.216 | 0.08 | 0.04 |
| 114 | P2 = 0.0.637 | 0.165 | 0.333 | 0.07 | 0.195 | 0.08 | 0.04 |
| 116 | P3 = 0.603 | 0.16 | 0.333 | 0.07 | 0.184 | 0.08 | 0.04 |
| 118 | P4 = 0.534 | 0.12 | 0.333 | 0.07 | 0.164 | 0.08 | 0.04 |
| 120 | P5 = 0.500 | 0.12 | 0.333 | 0.07 | 0.164 | 0.08 | 0.04 |
| 122 | P6 = 0.569 | 0.15 | 0.333 | 0.07 | 0.174 | 0.08 | 0.04 |
| 124 | P7 = 0.671 | 0.18 | 0.333 | 0.07 | 0.205 | 0.08 | 0.04 |
| 126 | P8 = 0.740 | 0.21 | 0.333 | 0.07 | 0.226 | 0.08 | 0.04 |

As may be recognized by those of ordinary skill in the pertinent art based on the teachings herein, numerous changes and modifications may be made to the above-described and other embodiments of the present invention without departing from its scope as defined in the appended claims. For example, the teeth may take any of numerous different sets, pitches, set patterns, and/or pitch patterns other than those disclosed herein. The saw blades may be formed with any of numerous different materials, and manufactured or otherwise configured in any of numerous different ways that are currently known, or that later become known, including carbon tipped blades and bimetal blades. Furthermore, although the currently preferred embodiments of the present invention are band saw blades, the teachings of the present invention may be applicable to any of numerous other types of saw blades, such as jig saw blades, reciprocating saw blades, hand saw blades, hole saw blades and circular saw blades. Accordingly, this detailed description of preferred embodiments is to be taken in an illustrative as opposed to a limiting sense.

What is claimed is:

1. A saw blade, comprising:
  a cutting edge including a plurality of first means for cutting spaced relative to each other, each first means including:
  a tip;
  a rake face formed on one side of the tip;
  a primary clearance surface formed on an opposite side of the tip relative to the rake face;
  at least one secondary clearance surface formed on an opposite side of the primary clearance surface relative to the tip; and
  a gullet located on an opposite side of the rake face relative to the tip and defining a depth (D) between a base surface of the gullet and the tip; wherein each first means defines:
  a first gullet radius (R1) located between the gullet and the at least one secondary clearance surface;
  a second gullet radius (R2) extending between a base surface of the gullet and the rake face; and
  a pitch (P) between the respective first means and a preceding first means in a cutting direction of the saw blade; and
  wherein R2>D>R1, and D/P is within the range of about 25% to about 35%.

2. A saw blade as defined in claim 1, wherein each first means is a tooth.

3. A saw blade as defined in claim 2, wherein each tooth defines a set-bend plane, and further comprises second means projecting outwardly on an opposite side of the tooth relative to the rake face and extending over the set-bend plane for increasing the width of the tooth at the set-bend plane and preventing set collapse.

4. A saw blade as defined in claim 3, wherein the second means is defined by the secondary clearance surface formed on the opposite side of the primary clearance surface relative to the tip, and a tertiary clearance surface formed on an opposite side of the secondary clearance surface relative to the primary clearance surface, and wherein the secondary clearance surfaces defines a secondary acute relief angle that is less than a primary acute relief angle of the primary clearance surface, and the tertiary clearance surface is defined by a radius within the range of about 0.06 inch to about 0.1 inch.

5. A saw blade as defined in claim 2, further comprising third means for substantially evenly distributing the cutting load over each group of teeth of like set direction when cutting a work piece.

6. A saw blade as defined in claim 5, further comprising fourth means for generating a different forcing frequency for each tooth entering and exiting the work piece in comparison to at least one of (i) every other tooth simultaneously entering or exiting the work piece, and (ii) every other tooth successively entering or exiting the work piece, when cutting the work piece.

7. A saw blade as defined in claim 5, wherein the plurality of teeth define a pitch pattern of at least eight teeth, and set patterns within each pitch pattern, and the third means is defined by a plurality of unset raker teeth within each pitch pattern, and offset trailing teeth following each unset raker tooth within each set pattern, and is further defined by the ratio of tooth spacing to accumulated tooth spacing for each tooth of like set direction within each set pattern increasing from one tooth to the next in the direction opposite the cutting direction of the saw blade.

8. A saw blade as defined in claim 6, wherein the plurality of teeth define a pitch pattern of at least eight teeth, and set patterns within each pitch pattern, and the fourth means is defined by each tooth having a different forcing frequency than every other tooth within at least one of its respective pitch pattern and its respective set pattern.

9. A saw blade, comprising:
   a cutting edge defined by a plurality of teeth spaced relative to each other, each tooth including:
   a tip;
   a rake face formed on one side of the tip;
   a primary clearance surface formed on an opposite side of the tip relative to the rake face;
   at least one secondary clearance surface formed on an opposite side of the primary clearance surface relative to the tip; and
   a gullet located on an opposite side of the rake face relative to the tip and defining a depth (D) between a base surface of the gullet and the tip; wherein each tooth defines:
   a first gullet radius (R1) located between the gullet and the at least one secondary clearance surface;
   a second gullet radius (R2) extending between a base surface of the gullet and the rake face; and
   a pitch (P) between the respective tooth and a preceding tooth in a cutting direction of the saw blade; and
   wherein R2>D>R1, and D/P is within the range of about 25% to about 35%.

10. A saw blade as defined in claim 9, wherein R2/R1≧about 1.4.

11. A saw blade as defined in claim 9, wherein the gullet defines a minimum radius ($R_{min}$) at a base of the gullet, and $R_{min}$/D>about 20%.

12. A saw blade as defined in claim 9, wherein the at least one secondary clearance surface includes a tertiary clearance surface formed on an opposite side of the secondary clearance surface relative to the primary clearance surface, the primary clearance surface defines a primary acute relief angle, and the secondary clearance surface defines a secondary acute relief angle that is less than the primary acute relief angle.

13. A saw blade as defined in claim 12, wherein the primary acute relief angle is within the range of about 22° to about 35°, and the secondary acute relief angle is within the range of about 5° to about 20°.

14. A saw blade as defined in claim 12, wherein the tertiary clearance surface is defined by a radius (R4) within the range of about 0.06 inch to about 0.1 inch.

15. A saw blade as defined in claim 14, wherein R4 terminates at a depth D2 below the tip, and D2 is within the range of about 0.06 inch to about 0.1 inch.

16. A saw blade as defined in claim 9, wherein D/P is within the range of about 29% to about 33%.

17. A saw blade as defined in claim 9, wherein the saw blade is a wood-cutting band saw blade.

18. A saw blade as defined in claim 9, wherein the rake face extends to a depth D3 below the tip, and D3 is within the range of about 0.01 inch to about 0.06 inch.

19. A saw blade as defined in claim 18, wherein the rake face defines an acute rake face angle within the range of about 5° to about 20°.

20. A saw blade as defined in claim 9, wherein each tooth further defines a gullet radius transition (R3) extending between the second gullet radius (R2) and the rake face, and R3 is within the range of about 0.03 inch to about 0.12 inch.

21. A saw blade as defined in claim 9, wherein the plurality of teeth define a pitch pattern of at least eight teeth, and set patterns within each pitch pattern.

22. A saw blade as defined in claim 21, wherein the saw blade is a wood-cutting band saw blade, each set pattern is defined by an unset leading tooth and a plurality of offset trailing teeth, each offset trailing tooth is offset in a respective set direction relative to the unset leading tooth, and each offset trailing tooth defines approximately the same set magnitude as every other like set tooth within the respective set pattern.

23. A saw blade as defined in claim 22, wherein each tooth within each set pattern defines an accumulated pitch between the respective tooth and a preceding tooth of like set direction in the cutting direction of the saw blade; and the ratio of pitch to accumulated pitch for each tooth of like set direction within each set pattern increases from one tooth to the next in the direction opposite the cutting direction of the saw blade for distributing the cutting load over the teeth of the saw blade.

24. A wood cutting band saw blade, comprising:
   a cutting edge defined by a plurality of teeth spaced relative to each other, each tooth including:
   a tip;
   a rake face formed on one side of the tip, wherein the rake face defines an acute rake face angle within the range of about 5° to about 20°, extends to a depth D3 below the tip, and D3 is within the range of about 0.01 inch to about 0.06 inch;
   a primary clearance surface formed on an opposite side of the tip relative to the rake face;
   a secondary clearance surface formed on an opposite side of the primary clearance surface relative to the tip;
   a tertiary clearance surface formed on an opposite side of the secondary clearance surface relative to the primary clearance surface, wherein the primary clearance surface defines a primary acute relief angle within the range of about 22° to about 35°, the secondary clearance surface defines a secondary acute relief angle within the range of about 5° to about 20°, the tertiary clearance surface is defined by a radius within the range of about 0.06 inch to about 0.1 inch, and said radius terminates at a depth D2 below the tip within the range of about 0.06 inch to about 0.1 inch; and
   a gullet located on an opposite side of the rake face relative to the tip and defining a depth (D) between a base surface of the gullet and the tip; wherein each tooth defines:
   a first gullet radius (R1) located between the gullet and the tertiary clearance surface;
   a second gullet radius (R2) extending between a base surface of the gullet and the rake face; and
   a pitch (P) between the respective tooth and a preceding tooth in a cutting direction of the saw blade; and
   wherein R2>D>R1, R2/R1≧about 1.4, and D/P is within the range of about 25% to about 35%.

* * * * *